US012779710B2

(12) United States Patent
Takahashi et al.

(10) Patent No.: US 12,779,710 B2
(45) Date of Patent: Nov. 3, 2026

(54) ROBOT SYSTEM

(71) Applicant: FANUC CORPORATION, Yamanashi (JP)

(72) Inventors: Yuutarou Takahashi, Yamanashi (JP); Fumikazu Warashina, Yamanashi (JP); Junichirou Yoshida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 315 days.

(21) Appl. No.: 18/245,537

(22) PCT Filed: Oct. 5, 2021

(86) PCT No.: PCT/JP2021/036767
§ 371 (c)(1),
(2) Date: Mar. 15, 2023

(87) PCT Pub. No.: WO2022/075303
PCT Pub. Date: Apr. 14, 2022

(65) Prior Publication Data

US 2023/0364812 A1 Nov. 16, 2023

(30) Foreign Application Priority Data

Oct. 8, 2020 (JP) ................................ 2020-170372

(51) Int. Cl.
*B25J 19/02* (2006.01)
*B25J 9/10* (2006.01)
*B25J 9/16* (2006.01)

(52) U.S. Cl.
CPC ............... *B25J 19/023* (2013.01); *B25J 9/10* (2013.01); *B25J 9/1661* (2013.01)

(58) Field of Classification Search
CPC ........ B25J 5/007; B25J 13/089; B25J 9/1692; B25J 9/1697; B25J 9/10; B25J 19/023; B25J 9/1661; G05B 2219/39045
See application file for complete search history.

(56) References Cited

U.S. PATENT DOCUMENTS

2006/0074525 A1* 4/2006 Close .................... B25J 9/1617 700/245
2016/0091892 A1* 3/2016 Okita .................... B25J 9/1674 700/121

(Continued)

FOREIGN PATENT DOCUMENTS

CN 106601647 A 4/2017
CN 109834710 A 6/2019

(Continued)

OTHER PUBLICATIONS

International Search Report issued in PCT/JP2021/036767; mailed Dec. 28, 2021.

*Primary Examiner* — Khoi H Tran
*Assistant Examiner* — Tristan J Greiner
(74) *Attorney, Agent, or Firm* — Studebaker Brackett PLLC

(57) ABSTRACT

The objective of the present invention is to provide a robot system with which, if the position of a robot becomes displaced, it is easy to perform work by employing a camera or the like to apply a three-dimensional correction. This robot system is provided with: a robot 2; a robot conveying device 3 on which the robot is mounted, for moving the robot to a predetermined work space; at least two target marks 4 installed in the work space; a target mark position acquiring unit 5 for obtaining a three-dimensional position by using a vision sensor provided on the robot 2 to perform stereoscopic measurement of the at least two target marks 4; a displacement amount acquiring unit 6 for obtaining the (Continued)

displacement amount between the robot 2 and a desired relative position in the work space, from the acquired three-dimensional position; and a robot control unit 7 for activating the robot 2 using a value adjusted from a prescribed activation amount, using the acquired displacement amount.

6 Claims, 4 Drawing Sheets

(56) References Cited

U.S. PATENT DOCUMENTS

| | | | | |
|---|---|---|---|---|
| 2016/0151915 | A1* | 6/2016 | Nishi | B25J 9/1697 901/6 |
| 2017/0203434 | A1* | 7/2017 | Ueda | B25J 9/0081 |
| 2018/0093380 | A1* | 4/2018 | Yoshida | B25J 9/1697 |
| 2019/0231460 | A1* | 8/2019 | DiMaio | A61B 34/30 |
| 2019/0314998 | A1* | 10/2019 | Yui | B25J 9/1656 |
| 2020/0108506 | A1* | 4/2020 | Goller | B25J 9/1697 |

FOREIGN PATENT DOCUMENTS

| | | | |
|---|---|---|---|
| CN | 110193832 | A | 9/2019 |
| JP | H03-281182 | A | 12/1991 |
| JP | H04-048304 | A | 2/1992 |
| JP | H06-19002 | U | 3/1994 |
| JP | H09-070781 | A | 3/1997 |
| JP | 2012-240174 | A | 12/2012 |
| JP | 2018-058142 | A | 4/2018 |

* cited by examiner

ROBOT SYSTEM

TECHNICAL FIELD

The present invention relates to a robot system.

BACKGROUND ART

In recent years, many techniques have been proposed wherein, for example, a robot is placed on a cart or an automated guided vehicle (AGV) and moved, whereby various types of work are automated by the robot in the vicinity of a workspace of an industrial machine such as a machine tool.

Here, in a system provided with a robot that is disposed at a prescribed position using, for example, a machine tool and a cart or an AGV or the like, when the robot is to perform various kinds of work such as loading or unloading a workpiece with respect to the machine tool, the robot cannot sufficiently perform the required tasks by performing the same operation each time, because the stopping position of the cart or the AGV on which the robot is mounted may change. Therefore, there is a need for measuring a displacement of the stopping position of the cart or the AGV relative to the machine tool and correcting the operation of the robot such that the work can be performed correctly in the workspace.

As a technique for correcting the operation of a robot, there is proposed, for example, a technique wherein a camera is mounted to the hand of the robot, the relative positions of the robot and the workspace such as a machine tool is obtained by detecting target marks provided in the workspace using the camera, and the operation is corrected by the amount of displacement.

For example, Patent Document 1 discloses "A coordinate correction method for a mobile robot, the mobile robot being a playback-type work robot having a visual sensor attached to an arm thereof, and being configured such that, when entering and stopping in a work station of the work robot, before initiation of a work program, the mobile robot captures an image of two marks provided at prescribed locations on a surface of the work station using the visual sensor oriented vertically, obtains horizontal coordinates of the marks using an image processing device, calculates a displacement between the horizontal coordinates and teaching horizontal coordinates, and then executes the work program while correcting the taught horizontal coordinates of the work program by the displacement, the method having a step of capturing an image of the marks with the visual sensor inclined by a prescribed angle $\theta$ before initiation of the work program, the horizontal coordinates of the marks are calculated from the image, a displacement amount $\sigma$ in the vertical direction is extracted from the displacement between the horizontal coordinates and teaching horizontal coordinates in the same inclined orientation, a calculation is conducted based on the formula $\Delta h=\sigma/\sin\theta$, and the taught vertical coordinates of the work program are corrected using the value of $\Delta h$".

Patent Document 2 discloses "A three-dimensional position and orientation calibration method for an autonomously traveling robot that is provided with an autonomous traveling part and an arm part of a teaching playback-type robot mounted on the traveling part, when the robot travels toward a target point using the traveling part and stops at the target point, an image of a calibration mark mounted to a prescribed position at the target point is captured by a visual sensor provided on the arm part, and the deviation of the stopping position from a teaching position at the target point is calibrated on the basis of the captured image, wherein each operation shaft of the arm part is driven such that the image of the calibration mark is captured at a prescribed shape and size at a prescribed position of the captured image, a calibration amount of the three-dimensional position and orientation is obtained from a drive amount of each operation shaft, and teaching data of the arm part are calibrated in a three-dimensional manner on the basis of the calibration amount".

Patent Document 1: Japanese Unexamined Patent Application, Publication No. H03-281182
Patent Document 2: Japanese Unexamined Patent Application, Publication No. H09-070781

DISCLOSURE OF THE INTENTION

Problems to be Solved by the Invention

However, when a robot is placed on a cart or an AGV and the position of the robot changes every time, there is a strong demand for easily applying a three-dimensional correction using a camera or the like so that work can be performed. That is to say, there is a strong demand for not only being able to perform the work, but also for enabling work in a simple and quick manner without making the user have to pay particular attention to the difficulty of the work.

Means for Solving the Problems

One aspect of a robot system according to the present disclosure is provided with a robot, a robot conveying device on which the robot is mounted, for moving the robot to a predetermined workspace, at least two target marks installed in the workspace, a target mark position acquiring unit for obtaining a three-dimensional position by using a vision sensor provided on the robot to perform stereoscopic measurement of the at least two target marks, a displacement amount acquiring unit for obtaining a displacement amount between the robot and a desired relative position in the workspace, from the acquired three-dimensional position, and a robot control unit for operating the robot using a value corrected from a prescribed operation amount, using the acquired displacement amount.

Effects of the Invention

According to one aspect of the robot system according to the present disclosure, even when the position of the robot becomes displaced due to the movement of a robot conveying device such as a cart or an AGV, a three-dimensional correction can be applied such that the robot can perform work at a precise relative position.

By performing stereoscopic measurement of each of two or more target marks, it is possible to apply a three-dimensional correction using, for example, a low-cost two-dimensional camera.

It is thus possible to automatically apply the correction and cause the robot to operate and perform work in a precise and desirable manner, without the user having to pay attention to the concept of coordinate systems or vision settings.

PREFERRED MODE FOR CARRYING OUT THE INVENTION

A robot system according to an embodiment of the present invention is described below with reference to FIGS. 1 to 6.

Figure 1:
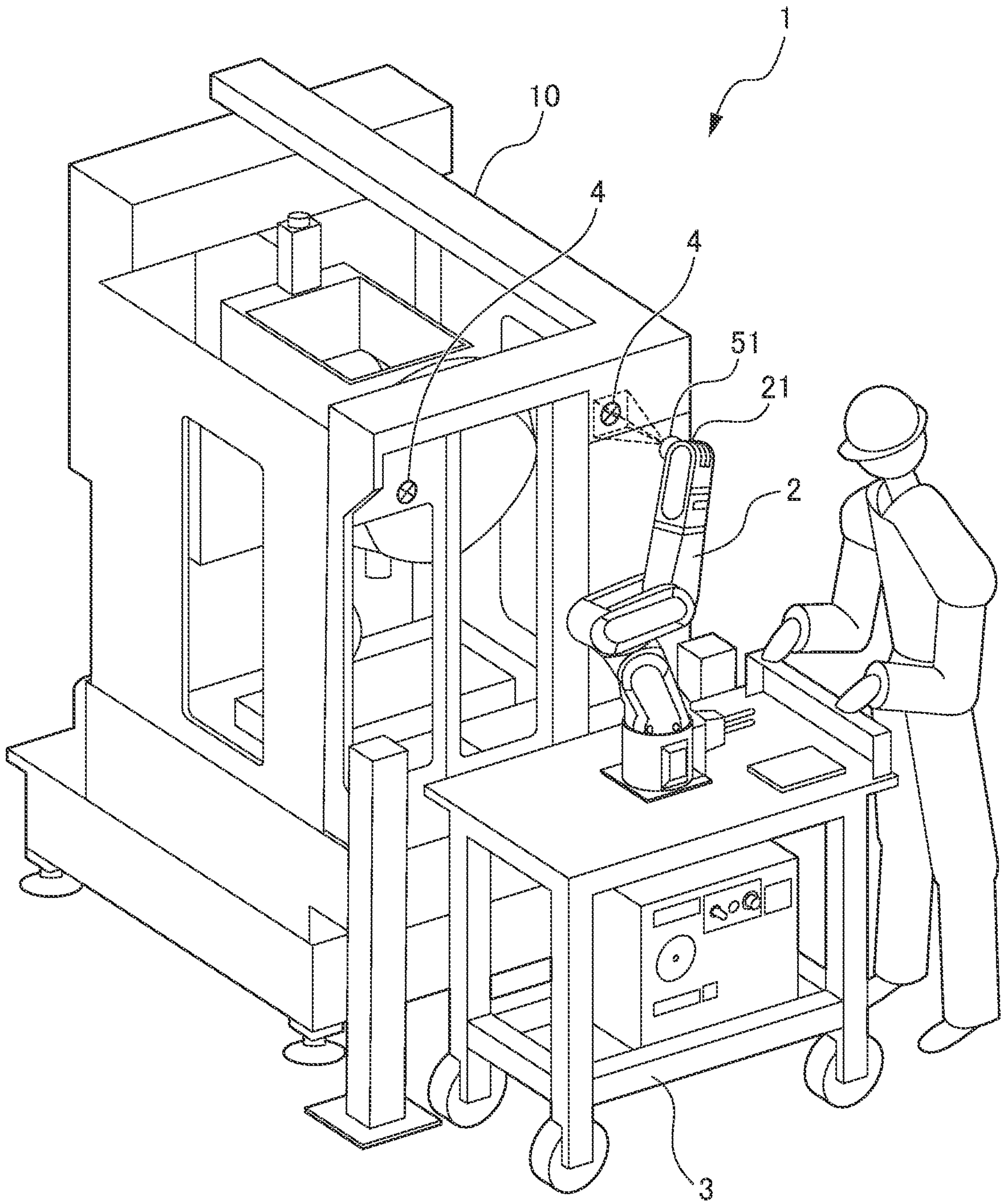
FIG. 1 illustrates one aspect of a robot system according to the present disclosure.
Figure 2:
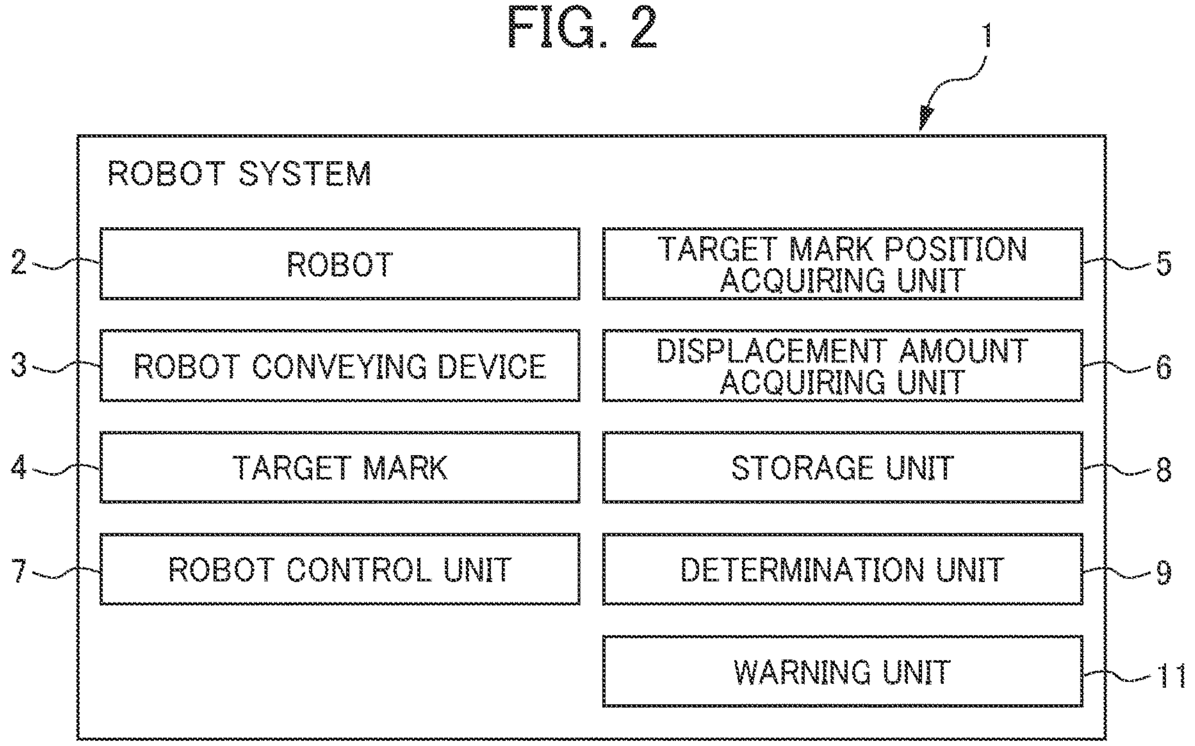
FIG. 2 is a block diagram illustrating one aspect of the robot system according to the present disclosure.

As illustrated in FIGS. 1 and 2, a robot system 1 according to the present embodiment is provided with a robot 2, a robot conveying device 3 on which the robot 2 is mounted, for moving the robot 2 to a prescribed workspace (work area), at least two target marks 4 installed in the workspace, a target mark position acquiring unit 5 for obtaining three-dimensional positions by using a visual sensor 51 provided on the robot 2 to perform stereoscopic measurement of the at least two target marks 4, a displacement amount acquiring unit 6 for obtaining a displacement amount between the robot 2 and a desired relative position in the workspace, from the acquired three-dimensional positions, and a robot control unit 7 for operating the robot 2 using a value corrected from a prescribed operation amount, using the acquired displacement amount.

The visual sensor 51 of the target mark position acquiring unit 5 is provided on a movable part of the robot 2. Specifically, the visual sensor 51 is provided on a movable part such as a hand section, a wrist section, an arm section, or the like of the robot 2. In the present embodiment, stereoscopic measurement is performed, and therefore, a low-cost two-dimensional camera may be used as the visual sensor 51.

The robot 2 illustrated in FIG. 1 is configured with six axes. In the present embodiment, it is preferable that at least three target marks 4 be installed in the workspace. In this case, by providing the visual sensor 51 to a hand section 21 of the robot 2, as illustrated in FIG. 1, the robot control unit 7 is configured to operate the robot 2 while applying a three-dimensional six-degree-of-freedom correction.

In the robot system 1 according to the present embodiment, for example, an operation program of the robot 2, an image processing program including the measuring settings for the visual sensor 51 and a program for calculating the displacement amount, and camera calibration data for the visual sensor 51 are set and packaged in advance, and stored in a storage unit 8. This will be described in detail below.

In addition, in the robot system 1 according to the present embodiment, one target mark 4 is measured and the position thereof is obtained immediately before or during the measuring work of the visual sensor 51, and a determination unit 9 determines whether or not the acquired displacement amount exceeds a preset threshold value. Then, in case the result of the determination indicates that the displacement amount exceeds the threshold value, all target marks 4 in the workspace at the current time are measured and the displacement amount is reacquired.

In addition, the robot system 1 according to the present embodiment is configured to perform rough positioning using the target marks 4 provided on a machine tool 10 that is the workspace while or immediately before the robot enters the machine tool 10, and then the robot enters the machine tool 10 that is the workspace and obtain a precise displacement amount of the machine tool 10 using the target marks 4 provided in the interior of the machine tool 10.

Further, the robot system 1 according to the present embodiment is provided with a warning unit 11, and is configured such that before the robot enters the machine tool 10, the warning unit 11 issues an alarm when the space between the robot 2 and the machine tool 10 becomes equal to or less than a preset threshold value.

With the robot system 1 according to the present embodiment having the configuration described above, two or more target marks 4 are installed in the workspace by pasting or the like, and each of the target marks 4 is stereoscopically measured to obtain a three-dimensional position. Preferably, three target marks are set, in which case at least two target marks 4 are set in the interior of the workspace and at least one is set in the exterior of the workspace.

Figure 3:
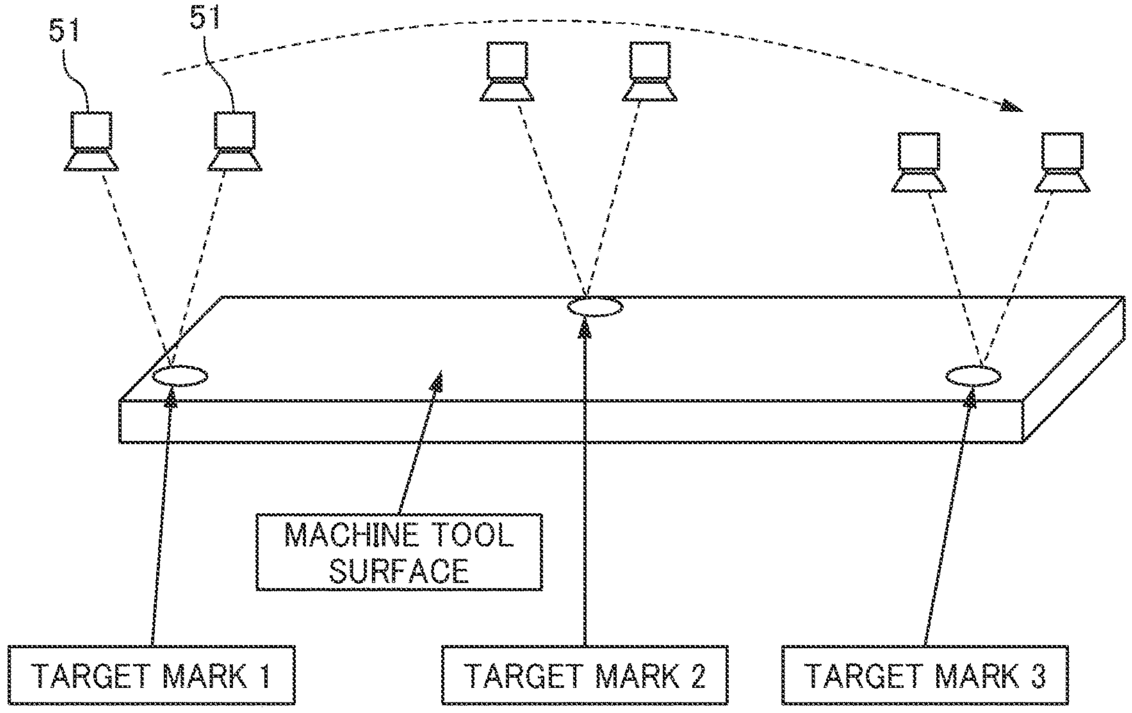
FIG. 3 illustrates a method and a sequence for stereoscopically measuring target marks using a visual sensor provided on the robot and obtaining three-dimensional positions thereof.
Figure 4:
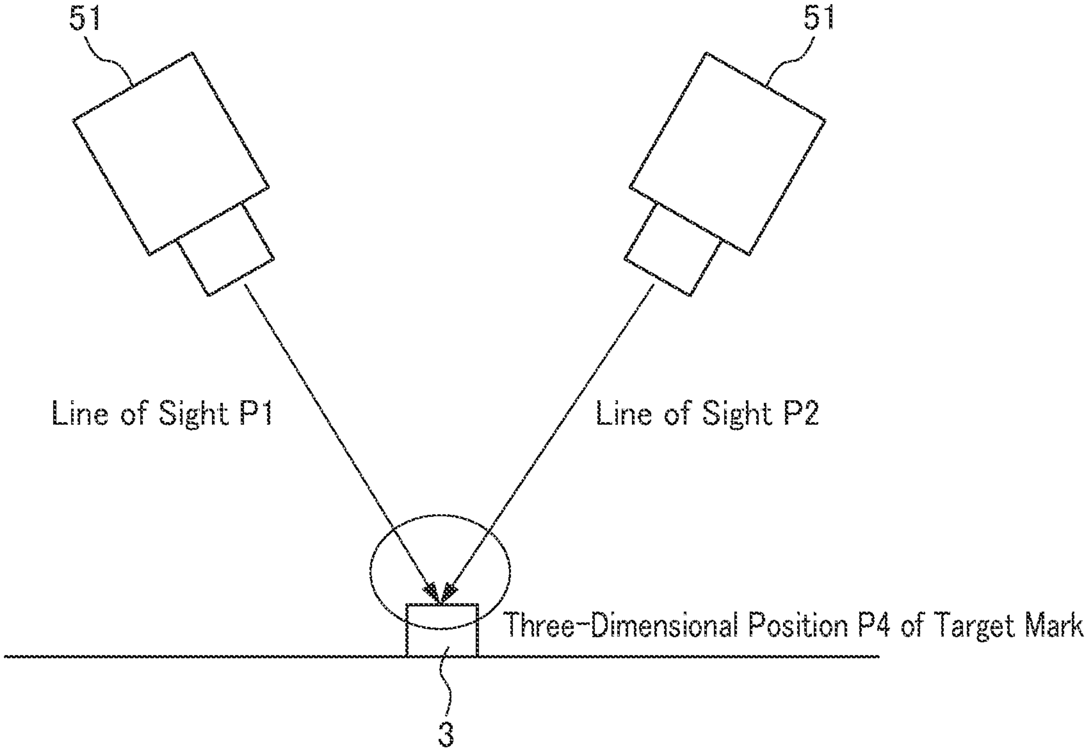
FIG. 4 illustrates a method and a sequence for stereoscopically measuring target marks using a visual sensor provided on the robot and obtaining three-dimensional positions thereof.
Figure 5:
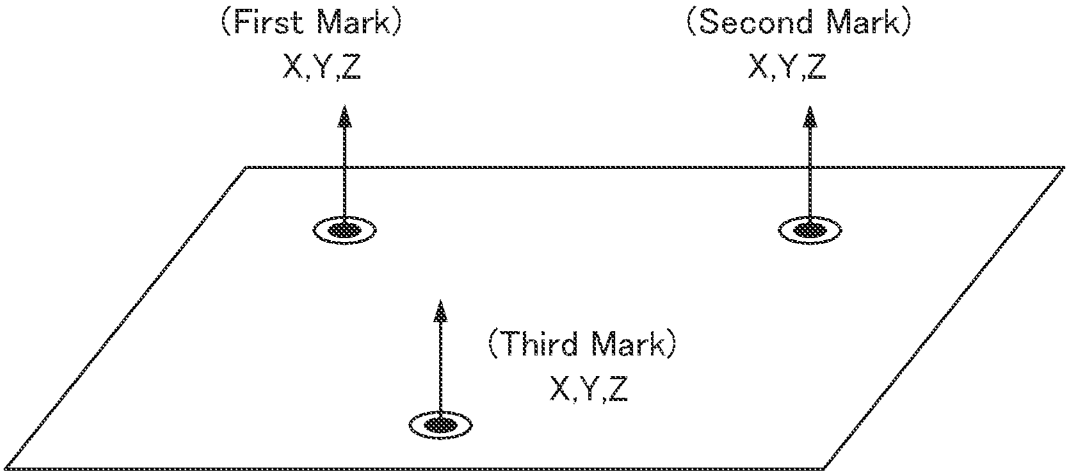
FIG. 5 illustrates a method and a sequence for stereoscopically measuring target marks using a visual sensor provided on the robot and obtaining three-dimensional positions thereof.

For example, as illustrated in FIGS. 3 to 5, by changing the position of the visual sensor 51 (target mark position acquiring unit 5) composed of a camera and detecting the same target mark 4 twice, the three-dimensional position (X, Y, Z) of the target mark 4 is measured.

At this time, one target mark 4 is detected at two camera (target mark position acquiring unit 5, visual sensor 51) positions, and the three-dimensional position of the target mark 4 is calculated through a stereoscopic calculation on the basis of the two detected results. For example, lines of sight from the camera toward the target mark 4 are detected (X, Y, W', P', R'), and the three-dimensional position of a workpiece is detected through a stereoscopic calculation using two pieces of line-of-sight data. W' and P' are direction vectors representing the lines of sight, and R' is the angle around the target.

In a preferred aspect of the present embodiment, each of three target marks 4 installed on a surface of the machine tool 10 is stereoscopically measured to measure the three-dimensional position (X, Y, Z) of each target mark 4. By stereoscopically measuring each of the three target marks 4, a total of six detections are performed.

Next, by combining the acquired three-dimensional positions of the three target marks 4, the three-dimensional position and orientation of the machine tool 10 relative to the robot 2 are obtained. In other words, three locations on one object are three-dimensionally measured, and the measured results are combined to obtain the position and the orientation of the entire object. In the present embodiment, three locations on the surface of the machine tool 10 are measured, and the position and the orientation of the entire machine tool 10 are calculated.

For example, the three-dimensional position (X, Y, Z, W, P, R) of the entire machine tool is calculated from the three-dimensional positions (X, Y, Z) of the three target marks 4. At this time, the three-dimensional position (X, Y, Z, W, P, R) of the entire machine tool is calculated by calculating a coordinate system wherein the position of the first target mark 4 is determined as the origin, the position of the second target mark 4 is determined as an X-axis direction point, and the position of the third target mark 4 is determined as a point on an XY plane.

Figure 6:
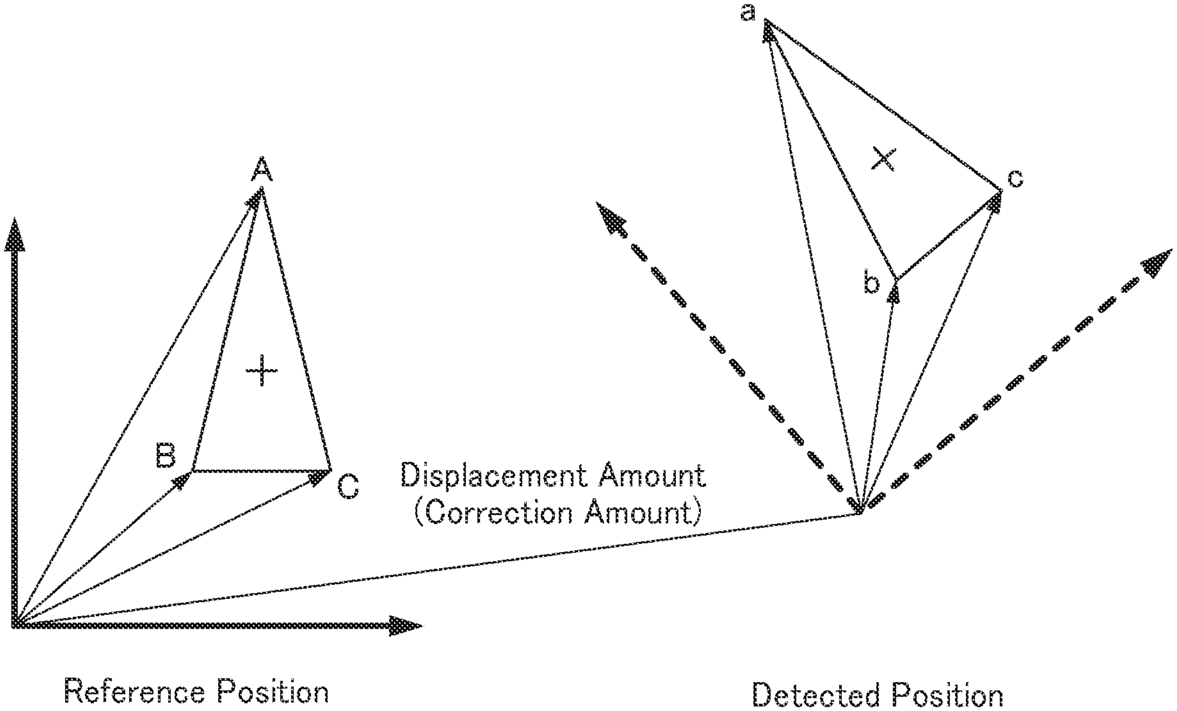
FIG. 6 illustrates a method and a sequence for obtaining a displacement amount between the robot and a desired relative position in the workspace, from the acquired three-dimensional positions, and performing a correction using the acquired displacement amount.

Next, as illustrated in FIG. 6, a three-dimensional six-degree-of-freedom positional displacement between the robot 2 and the workspace on the machine tool is obtained from the calculated three-dimensional position of the machine tool, and the operation of the robot 2 is corrected.

In the present embodiment, the displacement amount is calculated from the actual detected three-dimensional positions and orientations and an original reference position and orientation. A prescribed operation of the robot 2 is corrected by moving and rotating the coordinate system itself such that the machine tool in the actual detected position overlaps the machine tool in the reference position, and setting the thus obtained movement amount of the coordinate system as the displacement amount (correction amount). Although FIGS. 3 to 5 are two-dimensional illustrations, the above essentially applies in three dimensions as well.

In the present embodiment, all settings are set from the start on the basis of the correction method for the robot 2 described above, and made usable as a package. The specific components of the package are the operation program of the robot 2, the image processing program, and the camera calibration data. These are stored in the storage unit 8.

The storage unit 8 stores calibration data for the camera (visual sensor 51) using a coordinate system (mechanical interface coordinate system) set at the hand section 21 of the robot 2, that is to say, calibration data for the mechanical interface system. Meanwhile, the robot control unit 7 can ascertain the position of the hand section 21 of the robot 2 in the robot coordinate system at the time of capturing an image by the camera (visual sensor 51). Thus, by associating two-dimensional points in the sensor coordinate system and three-dimensional points in the mechanical interface coordinate system with one another using the calibration data stored in the storage unit 8, and coordinate transforming the mechanical interface coordinate system into the robot coordinate system according to the position of the hand section 21 of the robot 2 ascertained by the robot control unit 7, the two-dimensional points in the sensor coordinate system and the three-dimensional points in the robot coordinate system at the time of capturing an image by the camera (visual sensor 51) can be associated with one another. In other words, the position and orientation of the sensor coordinate system as seen from the robot coordinate system can be obtained, and thus the three-dimensional position can be calculated.

In the present embodiment, while or immediately before the robot 2 performs work with respect to the workspace, only one target mark is first measured visually, and in a case where the measured result is the same as when the above operation is performed, it is determined that the positional relationship of the robot and the workspace has not changed after performing the operation and the work is resumed, and in a case where the result differs, the work is interrupted and the operation performed again.

Always measuring all target marks 4 every time takes a lot of time, but with the technique according to the present embodiment, the time can be shortened. The threshold for determining that the positions are the same can be set according to the total required precision of the system.

When the workspace is a machine tool 10 as in the present embodiment (when the workspace is set to the interior (inside) of the machine tool 10), rough positioning using the target marks 4 provided on the outside of the machine tool 10 is performed while or immediately before the robot 2 enters the machine tool 10, and then the robot 2 enters the machine tool 10 and performs precise positioning (two-step positioning) using the target marks 4 provided in the interior of the machine tool 10.

In case precision is required, it is desirable to perform positioning relative to a table or the like in the interior of the machine tool 10, but when the frontage of the machine tool 10 is narrow, without measuring there is a possibility that the robot 2 collides with the inlet of the machine tool 10. In such case, it is sufficient that the robot 2 can be moved so as to not collide, and that an alarm can be raised if a collision is imminent.

Therefore, according to the robot system 1 according to the present embodiment, even when the position of the robot 2 becomes displaced due to the movement of the robot conveying device 3 such as a cart or an AGV, a three-dimensional six-degree-of-freedom correction can be applied such that the robot 2 can perform work. By applying a three-dimensional six-degree-of-freedom correction, it is possible to apply corrections that would not be possible with a simple XYZ three-dimensional correction, such as in cases where the floor is not flat or irregular.

In addition, by performing stereoscopic measurement of each of two or more target marks, a three-dimensional correction can be applied using, for example, a low-cost two-dimensional camera. In particular, by performing stereoscopic measurement of three or more target marks 4, a six-degree-of-freedom correction can be applied even using a low-cost two-dimensional camera. When using two marks, an amount of rotation about an axis that is a line connecting the two marks cannot be identified. However, in cases where this amount of rotation is not susceptible to change due to the configuration of the system, the configuration is sufficiently practical.

Further, the correction can be applied automatically and the robot 2 can perform work without the user having to pay attention to the concept of coordinate systems or vision settings.

An embodiment of the present robot system is described above, but the present invention is not limited to the embodiment described above, and may be modified as appropriate within a scope that does not depart from the gist thereof.

EXPLANATION OF REFERENCE NUMERALS

1 Robot system
2 Robot
3 Robot conveying device
4 Target mark
5 Target mark position acquiring unit
6 Displacement amount acquiring unit
7 Robot control unit
8 Storage unit
9 Determination unit
10 Machine tool (industrial machine)
11 Warning unit
21 Hand section
51 Visual sensor

The invention claimed is:

1. A robot system comprising:

a robot;

a robot conveying device on which the robot is mounted, for moving the robot to a workspace;

at least two target marks installed in the workspace;

a vision sensor provided on the robot, the vision sensor configured to perform stereoscopic measurement of the at least two target marks and configured to obtain a three-dimensional position of the at least two target marks; and a controller configured to:

execute a program to calculate a first displacement amount between the robot and a desired relative position in the workspace, based on the three-dimensional position of the at least two target marks, and execute an operation program to operate the robot using a value corrected from a prescribed operation amount, using the first displacement amount, wherein the vision sensor is further configured to obtain a three-dimensional position of one target mark of the at least two target marks while performing work, wherein the controller is further configured to:

execute a program to calculate a second displacement amount between the robot and a desired relative position in the workspace, based on the three-dimensional position of the one target mark, and execute a program to recalculate the first displacement amount of the at least two target marks in a case where the second displacement amount exceeds a preset threshold value.

2. The robot system according to claim 1, wherein the vision sensor is provided on a movable part of the robot.

3. The robot system according to claim 1, wherein the at least two target marks comprise at least three target marks installed in the workspace, the vision sensor is provided on a hand section of the robot, and the controller is configured to perform a three-dimensional correction and operate the robot.

4. The robot system according to claim 1, wherein an operation program for the robot, an image processing program including measuring settings for the vision sensor and a program for calculating the displacement amount, and camera calibration data for the vision sensor are set and packaged in advance.

5. The robot system according to claim 1, wherein the controller is further configured to:

execute a program to perform positioning using first at least two target marks provided on a machine tool that is the workspace while or before the robot enters the machine tool, and execute a program to obtain the first displacement amount of the machine tool using second at least two target marks provided in an interior of the machine tool after positioning performed using the first at least two target marks and the robot enters the machine tool.

6. The robot system according to claim 5, wherein before the robot enters the machine tool, an alarm is issued when a space between the robot and the machine tool becomes equal to or less than a preset threshold value.

* * * * *